United States Patent Office 3,652,558
Patented Mar. 28, 1972

3,652,558
SPIRO CONDENSED AROMATIC COMPOUNDS
Carl Dalton Lunsford, Richmond, Albert Duncan Cale, Jr., Mechanicsville, and Norman David Dawson, Richmond, Va., assignors to A. H. Robins Company, Incorporated, Richmond, Va.
No Drawing. Continuation-in-part of abandoned application Ser. No. 517,842, Dec. 30, 1965. This application Apr. 21, 1969, Ser. No. 818,134
Int. Cl. C07d 7/42, 27/04, 27/08, 65/16
U.S. Cl. 260—247.2
9 Claims

ABSTRACT OF THE DISCLOSURE

Novel spiro condensed aromatic compounds prepared by intramolecular rearrangement of 9-(1-substituted-3-pyrrolidinyl)fluorene-9-carboxylic acids,
9-(1-substituted-3-pyrrolidinyl)thioxanthene-9-carboxylic acids,
9-(1-substituted-3-pyrrolidinyl)xanthene-9-carboxylic acids, and
5-(1-substituted-3-pyrrolidinyl)-5H-dibenzo[a,d]-dihydrocycloheptene-5-carboxylic acids useful as sedatives and antidepressants are disclosed.

---

The present application is a continuation-in-part of copending application, Ser. No. 517,842 filed Dec. 30, 1965, now abandoned.

This invention relates to novel spiro condensed aromatic compounds, therapeutic compositions containing the same as active ingredients, methods of making and using them and acid addition salts thereof.

According to the present invention, there are provided novel basic spiro condensed aromatic compounds of the formula:

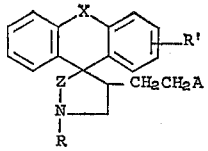

Formula I wherein:

X represents alkylene of less than three carbon atoms, a single bond joining the two aromatic rings, an oxygen atom and a sulfur atom;
R represents lower-alkyl, cyclohexyl and benzyl;
$R^1$ represents hydrogen, halogen having an atomic weight less than 80, trifluoromethyl, lower-alkyl and lower-alkoxy;
A represents halogen, lower-alkoxy, cyano and amino;
Z represents carbonyl and methylene, and the pharmaceutically acceptable acid addition salts thereof.

The compounds represented by Formula I are useful because they possess pharmacological activity. In particular, the compounds of Formula I, wherein Z is carbonyl, are useful as sedatives and as intermediates for the preparation of other active compounds, particularly compounds of Formula I, wherein Z is methylene which are useful in preventing depression from reserpine. The anti-depressant activity was shown by the method of Askew, B. M., J. Pharm. Pharmacol, 13, 701–703 (1961). The antidepressant control drug was imipramine. When tested by the above cited method the antidepressing activity of the compounds of Examples 16, 18, and 15 to reserpine in comparison with the antidepressing activity of imipramine had 91%, 82% and 45% of the activity of imipramine. The compounds were given in doses of 20 mg./kg. intraperitoneally. The above tests were performed on mice. At least 10 animals were used for each dosage.

It is, therefore, a primary object of this invention to provide novel and useful spiro condensed aromatic compounds of the type mentioned above which are useful as sedatives and antidepressants. A further object is to provide novel compositions embodying such compounds. A still further object is to provide novel methods of making the compounds and compositions. Other objects of the invention will be apparent to those skilled in the art from the following description and appended claims, and still other objects will become apparent hereinafter.

In the definitions of symbols in Formula I and where they appear elsewhere throughout this specification, the terms have the following significance.

Among the suitable amino radicals included within the symbol A are primary, secondary, and tertiary amino radicals, such as unsubstituted amino ($-NH_2$), (lower-alkyl)-amino, di-(lower-alkyl)-amino, di-(hydroxy-lower-alkyl)-amino, basic saturated monocyclic heterocyclic radicals of less than twelve carbon atoms, as exemplified by piperidino, (lower-alkyl)-piperidino, e.g., 2-, 3-, 4-(lower-alkyl)-piperidino, morpholino, (lower-alkyl)-morpholino, piperazino, (lower-alkyl)-piperazino (e.g., C- or $N^4$-methylpiperazino) and phenylpiperazino (e.g., $N^4$-phenylpiperazino).

The term "lower-alkyl" as used herein includes straight and branched chain radicals of up to eight carbon atoms inclusive and is exemplified by such groups as methyl, ethyl, propyl, isopropyl, tertiray butyl, amyl, isoamyl, hexyl, heptyl, octyl and the like. "Lower alkoxy" has the formula lower-alkyl-O-.

When A is amino, the compounds of Formula I may be converted to acid addition salts by reaction of the free base with the selected acid. When the compounds are to be used as intermediates for preparing other compounds or for any other non-pharmaceutical use, the toxicity or non-toxicity of the salt is immaterial. When the compounds are to be used as pharmaceuticals, they are most conveniently used in the form of water-soluble. pharmaceutically acceptable acid-addition salts. Both toxic and nontoxic salts are therefore within the purview of the invention. The acids which can be used to prepare the preferred non-toxic acid addition salts are those which produce, when combined with the free bases, salts whose anions are relatively innocuous to the animal organism in therapeutic doses of the salts, so that beneficial physiological properties inherent in the free bases are not vitiated by side-effects ascribable to the anions. Appropriate acid-addition salts are those derived from mineral acids such as hydrochloric acid, hydrobromic acid, hydriodic acid, nitric acid, sulfuric acid and phosphoric acid, and organic acids such as acetic acid, citric acid, lactic acid, and tartaric acid.

The acid addition salts are prepared either by dissolving the free base in an aqueous solution containing the appropriate acid and isolating the salt by evaporating the solution, or by reacting the free base and the selected acid in an organic solvent, in which case the salt separates directly or can be obtained by concentration of the solution. If two or more equivalents of acid are used, a poly-acid-addition salt is obtained in those instances where there is more than one basic nitrogen atom in the molecule. If one equivalent of acid is used, a mono-acid-addition salt is obtained.

When halogen is referred to herein, preferably but not necessarily, a halogen of atomic weight in excess of 19 is employed. Of the halogens, chlorine is preferred.

The novel spiro compounds of the present invention are prepared as shown in Chart I.

CHART I

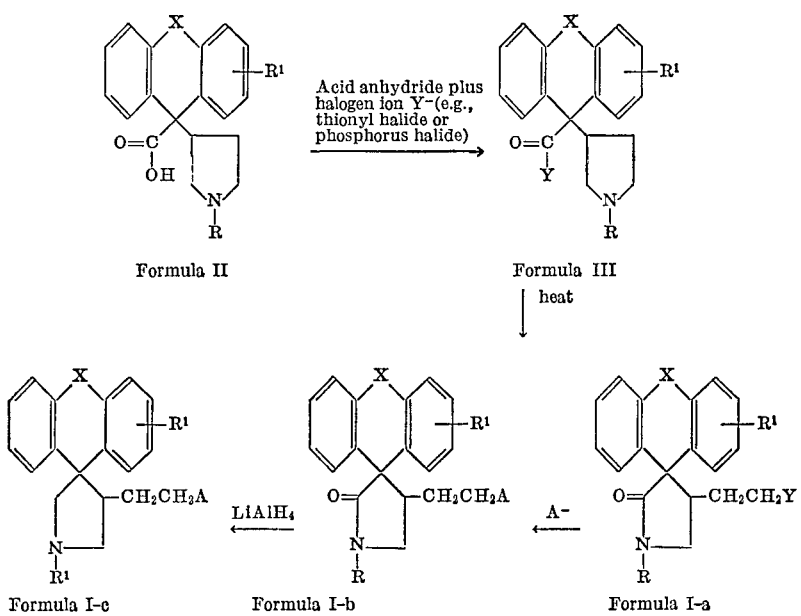

Formula II → Formula III (Acid anhydride plus halogen ion Y⁻ (e.g., thionyl halide or phosphorus halide))

Formula III → heat

Formula I-a ← A⁻ ← Formula I-b ← LiAlH₄ ← Formula I-c (R, $R^1$, X and A have values previously assigned; Y is halogen, preferably chlorine.)

The general procedure for the preparation of the novel spiro condensed compounds of the invention is outlined in Chart I. The compounds designated I-a, I-b, and I-c are compounds within the scope of the general Formula I.

A suitable general procedure for carrying out the process of the invention is as follows:

An acid of Formula II is reacted with an acid anhydride capable of forming a mixed anhydride of Formula III, and the mixed anhydride undergoes intramolecular rearrangement under the influence of heat to the spiro condensed aromatic compound of Formula I-a. The thermal stability of the mixed anhydrides of the condensed aromatic compounds is more pronounced when compared with a noncondensed aromatic system. When X in Formula III is a single bond joining the two aromatic rings as in fluorene, the competing reaction of intermolecular quaternization occurs. Dilution of the reaction mixture favors rearrangement over quaternization. The thermal rearrangement is followed by infrared analysis, the end point of the rearrangement being determined by complete replacement of the carbonyl band of the mixed acid anhydride by the characteristic carbonyl band of the pyrrolidinone nucleus.

The conversion of a compound of Formula I-a to a compound of Formula I-b is readily carried out by employing a reactant whose anion A⁻ is capable of replacing a halogen atom, Any suitable reaction procedure may be used.

When the substituent A in Formula I-b is amino derived from a relatively non-volatile amine such as morpholine, the halo derivative is refluxed, usually with at least two molar equivalents of the amine, until the reaction is substantially complete. The exact reaction time required may vary depending upon the particular amine used, but two hours is generally sufficient for complete reaction. A solvent, e.g., ethanol, isopropanol, dioxane, or the like, may be used, but such solvent is not essential. The excess amine and solvent are removed on a steam bath under reduced pressure. The residue is isolated and the product purified in any appropriate conventional manner. When a volatile amine, e.g., dimethylamine, is used, the reaction is carried out in a closed system using, preferably a stainless steel reaction bomb employing a suitable reaction solvent, e.g., ethanol, isopropanol, or the like. The reaction is generally run at elevated temperatures of from about 75° C. to about 150° C.

The procedures for the conversion of compounds I-a to compounds I-b wherein A is alkoxy, cyano, and the like, is more fully described in examples illustrating the same.

The carbonyl group of compounds I-b is readily reduced using a metal hydride as, for example, lithium aluminum hydride to the methylene group.

The starting materials for the process of the present invention are carboxylic acids of Formula II. They are prepared by the reaction sequences B and C in Chart 2, wherein all the symbols have the meanings given previously, sequence B including Formulas IV, V, II and sequence C including Formulas VI, VII and II.

CHART 2

PREPARATION OF STARTING CARBOXYLIC ACIDS II

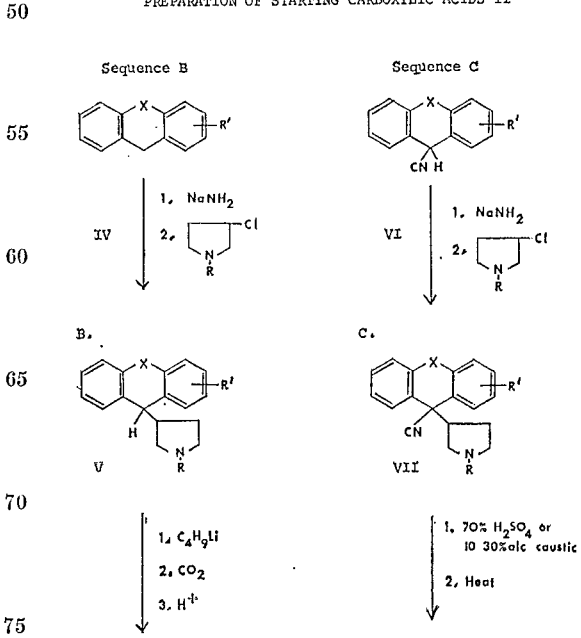

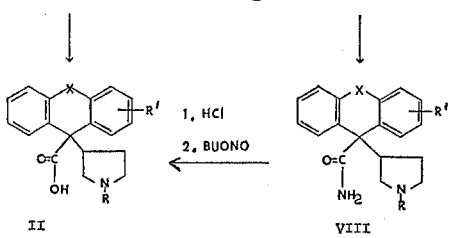

When X is a single bond as in fluorene, the carboxylic acid is readily prepared by reaction sequence B. 9-fluorenyl sodium is prepared by the reaction of fluorene and sodium amide in a dry solvent such as benzene, xylene or toluene, toluene being the preferred solvent. The condensation of the 3-chloropyrrolidine with 9-fluorenyl sodium is usually carried out with the application of heat in the same solvent medium for a period of three to about five hours. The reaction mixture is washed with water, the product extracted with dilute hydrochloric acid, the acid extract basified with sodium hydroxide, the base insoluble oil extracted with a solvent such as chloroform or ether, the combined extracts washed and dried, as over sodium sulfate, concentrated and the residue distilled in vacuo. The 9-(1-substituted - 3 - pyrrolidinyl)fluorene is dissolved in anhydrous ether and the 9-lithio salt prepared using freshly prepared butyl lithium or commercially available butyl lithium. Carbonation of the lithio salt followed by addition of dilute hydrochloric acid gives 9-(1-substituted-3-pyrrolidinyl)fluorene-9-carboxylic acid as the hydrochloride.

When X is an alkylene group of less than three carbon atoms as in 5H-dibenzo[a,d]-10,11-dihydrocycloheptane or an oxygen or a sulfur atom as in xanthene or thioxanthene, reaction sequence B cannot be followed. The ethylene bridge or an oxygen or sulfur atom in the condensed aromatic compounds limits the area in the vicinity of the active methylene group to the extent that introduction of the pyrrolidine group prevents the subsequent introduction of the carboxyl group. The spatial arrangement of a cyano group in the 5-position of 5H-dibenzo[a,d]-10,11-dihydrocycloheptene or in the 9-position of xanthene or thioxanthene does not prevent the introduction of the pyrrolidine group. The sodium salts of the respective cyano compounds are prepared by reaction with sodium amide in a dry solvent such as benzene,, xylene or toluene, toluene being the preferred solvent. The condensation of 3-chloropyrrolidine with the sodium salt thus prepared is carried out with the application of heat in the same solvent medium for a period of three to about five hours. The reaction mixture is washed with water, the product extracted with dilute hydrochloric acid, the acid extract basified with sodium hydroxide, the base insoluble oil extracted with a water-insoluble solvent such as chloroform or ether, the combined extracts washed and dried, as over sodium sulfate, concentrated and the residue distilled in vacuo.

Hydrolysis of the cyano group is accomplished in two steps. Partial hydrolysis to the primary amide is effected by heating in 70% sulfuric acid for a period of two to about five hours at 130–140° C. or by refluxing in 10–30% alcoholic caustic solution for a period of one to about three hours. The primary amide, which is isolated as a solid, is dissolved in a solvent such as dioxane and hydrolysis to the carboxylic acid is effected using dry hydrogen chloride and butyl nitrite. In an alternate procedure, the amide is dissolved in 70% sulfuric acid and solid sodium nitrile added in portions to complete the hydrolysis of the amide to the carboxylic acid.

The following preparations are given by way of illustration only and are in no event to be construed as limiting.

PREPARATION 1

9-(1-ethyl-3-pyrrolidinyl)fluorene-9-carboxylic acid hydrochloride

A mixture of 90 g. (0.54 mole) of fluorene, 20 g. (0.51 mole) of sodium amide and 200 ml. of toluene was stirred and refluxed four hours. To the rapidly stirred reaction mixture was added dropwise 66 g. (0.50 mole) of 1-ethyl-3-chloropyrrolidine. After three hours heating, the mixture was cooled, washed with water and the basic material extracted with dilute hydrochloric acid. The combined acid extracts were basified with sodium hydroxide, the base insoluble oil extracted with ether, the ether solution washed, dried and concentrated. Distillation of the residue gave 47.4 g. (36.2%) of 9-(1-ethyl-3-pyrrolidinyl)fluorene, B.P. 155–165° C./0.4 mm. To a stirred solution of 24 g. (0.092 mole) of 9-(1-ethyl-3-pyrrolidinyl)fluorene in 100 ml. of dry ether was added over a ten-minute period a freshly prepared ethereal solution of butyl lithium prepared from 3.44 g. (0.495 mole) of lithium metal and 27.4 g. (0.20 mole) of butyl bromide in 120 ml. of dry ether; the reaction mixture was kept at 5–10° C. After twenty minutes the mixture was poured onto an excess amount of solid carbon dioxide. The mixture was acidified to give 26.7 g. (85.0%) of 9-(1-ethyl-3-pyrrolidinyl)fluorene - 9 - carboxylic acid hydrochloride melting at 185° C.

PREPARATION 2

9-(1-ethyl-3-pyrrolidinyl)xanthene-9-carboxylic acid

A mixture of 13.0 g. (0.063 mole) of 9-cyano xanthene, 2.8 g. (0.07 mole) of sodium amide and 115 ml. of dry toluene was stirred and refluxed for three hours. The pot temperature was lowered to 80° C. and a solution of 9.4 g. (0.07 mole) of 1-ethyl-3-chloropyrrolidine in 60 ml. of dry toluene was added dropwise over fifteen minutes. The stirred mixture was refluxed eight hours, cooled, washed with water and extracted with dilute hydrochloric acid. The combined acid extracts were basified, the base insoluble oil extracted with chloroform, the chloroform solution washed, dried and concentrated. Distillation of the residue gave 6.0 g. (31.3%) of 9-cyano-9-(1-ethyl-3-pyrrolidinyl)-xanthene, B.P. 180–190° C./0.70 mm.

A mixture of 12.5 g. (0.041 mole) of 9-cyano-9-(1-ethyl-3-pyrrolidinyl)xanthene, 10 g. of sodium hydroxide, 10 ml. of water and 140 ml. of ethyl alcohol was refluxed two and one-half hours and then poured into 750 ml. of water. The oil which separated solidified with stirring and the solid was collected and dried. The 9-(1-ethyl-3-pyrrolidinyl)xanthene - 9 - carboxamide weighed 12.5 g. (95%) and melted at 131–134° C. The melting point was raised to 137–140° C. by recrystallization from ethanol-water.

Ten g. (0.03 mole) of 9-(1-ethyl-3-pyrrolidinyl)-9-xanthene carboxamide and 30 g. of 70% sulfuric acid was stirred and heated at 54–60° C. and 10.7 g. (0.155 mole) of sodium nitrite was added portionwise over twenty minutes. The viscous acidic mixture was basified and then partitioned between chloroform and dilute hydrochloric acid. The chloroform layer was concentrated and the residue taken up in acetone. Addition of ether to the acetone solution precipitated 9-(1-ethyl-3-pyrrolidinyl)-9-xanthene carboxylic acid.

Using the procedure of Preparation 2, 9 - (1 - ethyl-3 - pyrrolidinyl)thioxanthene - 9 - carboxylic acid and 5 - (1 - methyl - 3 - pyrrolidinyl) - 5H - dibenzo[a,d]-10,11 - dihydrocycloheptene - 5 - carboxylic acid are prepared.

The 9 - cyanoxanthene, 9 - cyanothioxanthene and 5-cyano - 5H - dibenzo[a,d] - 10,11 - dihydrocycloheptene of the above process are known to the art and can be prepared in a variety of ways such as:

(1) 9-cyanoxanthene.—(a) xanthene - 9 - carboxylic acid is prepared by reacting xanthene with butyl lithium and carbon dioxide; (b) xanthene - 9 - carboxamide is prepared by reacting xanthene - 9 - carboxylic acid with thionyl chloride an concentrated aqueous ammonium hydroxide; (c) xanthene - 9 - carboxamide is dehydrated to 9 - cyanoxanthene using phosphorus oxychloride.

(2) 9 - cyanothioxanthene is prepared from thioxanthene as in steps a, b, and c above.

(3) 5 - cyano - 5H - dibenzo[a,d] - 10,11 - dihydrocycloheptene is prepared by treating commercially available 5-chloro compound with silver cyanide.

The following examples illustrate in detail some of the compounds which comprise this invention and methods for their production. However, this invention is not to be construed as limited thereby in spirit or in scope. It will be apparent to those skilled in the art that numerous modifications in materials and methods can be adopted without departing from the invention.

EXAMPLE 1

4'-(β-chloroethyl)-1'-ethyl-2'-oxo-spiro-[fluorene-9,3'pyrrolidine]

A mixture of 28.5 g. (0.083 mole) of 9-(1-ethyl-3-pyrrolidinyl)fluorene-9-carboxylic acid and 300 ml. of thionyl chloride was refluxed one and one-half hours. An infrared spectrum showed complete conversion to the acid chloride. The solution was added slowly over a two hour period to 400 ml. of xylene maintained at or just below the boiling point with efficient stirring. The volatile thionyl chloride was allowed to distill out of the hot reaction mixture. Twenty minutes after the addition was completed the hot mixture was cooled, concentrated and the residue dissolved in isopropanol. Addition of water precipitated solid material which was crystallized from methanol. Two crops of 3.3 g. (M.P. 162–164° C.) and 4.2 g. (M.P. 155–161° C.) were isolated; the 7.5 g. represented a yield of 27.8%. Recrystallization from isopropanol raised the melting point to 164.5–166° C.

*Analysis.*—Calculated for $C_{20}H_{20}ClNO$ (percent): C, 73.72; H, 6.18; N, 4.29. Found (percent): C, 73.52; H, 6.17; N, 4.29.

Utilizing the method of Example 1, the following compounds are prepared from the stated ingredients.

2' - chloro - 4 - (β-chloroethyl) - 1 - cyclohexyl - 2 - oxo-spiro[pyrrolidine - 3,9' - xanthene] from 2 - chloro-9-(1 - cyclohexyl - 3 - pyrrolidinyl)xanthene-9-carboxylic acid and thionyl chloride.

1-benzyl - 4 - (β-chloroethyl) - 2 - oxo - 2' - trifluoromethyl-spiro[pyrrolidine - 3,9' - thioxanthene] from 2-trifluoromethyl - 9 - (1 - benzyl - 3 - pyrrolidinyl)-thioxanthene - 9 - carboxylic acid and thionyl chloride.

4' - (β-chloroethyl) - 2 - ethyl - 1' - methyl - 2' - oxo-spiro]fluorene - 9,3' - pyrrolidine] from 2 - ethyl - 9-(1 - methyl - 3 - pyrrolidinyl)fluorene - 9 - carboxylic acid and thionyl chloride.

4' - (β - chloroethyl) - 2 - ethoxy - 1' - methyl - 2' - oxo-spiro-[fluorene - 9,3' - pyrrolidine] from 2 - ethoxy-9-(1 - methyl - 3 - pyrrolidinyl)fluorene - 9 - carboxylic acid and thionyl chloride.

EXAMPLE 2

4'-(2-chloroethyl)-1'-methyl-2'-oxo-spiro[10,11-dihydrodibenzo[a,d]-cycloheptene-5,3'-pyrrolidine]

A solution of 185 g. (0.61 mole) of 5-cyano-5-(1-methyl - 3 - pyrrolidinyl)dibenzo-[a,e]-cycloheptatriene in 500 g. of 70% sulfuric acid was heated to 125° C. overnight, poured on ice and made basic with 50% sodium hydroxide. The mixture was extracted with chloroform which was dried and concentrated. The residue (203 g.) gave a strong carbonyl (amide) infrared absorption at 6.1μ. The residue was dissolved in 500 ml. of acetic acid and hydrogen chloride passed in until the solution was strongly acidic. The solution was cooled to 20° C. and 200 g. (1.94 moles) of butyl nitrite was added dropwise over a period of 1.5 hours. After standing overnight at room temperature the solution was concentrated in vacuo. The residue was partitioned between water and a mixture of equal parts of ethyl acetate and toluene. The aqueous layer was made strongly basic with 50% sodium hydroxide and extracted with chloroform. The chloroform was made acidic with hydrogen chloride, concentrated and the residue dissolved in 200 ml. of thionyl chloride. The solution was refluxed two hours, concentrated in vacuo, and the residue partitioned between ethyl acetate and water. The water was discarded. Crystals soon started forming in the ethyl acetate. These were redissolved by heating and the solution was treated with activated carbon, filtered and allowed to crystallize; yield 18 g. (9%); M.P. 169–171° C. A sample recrystallized from ethyl acetate melted at 170–172° C.

*Analysis.*—Calculated for $C_{21}H_{22}ClNO$ (percent): C, 74.21; H, 6.53; N, 4.12. Found (percent): C, 74.50; H, 6.63; N, 4.16.

The spiro condensed aromatic compounds containing a beta-lower-alkoxy ethyl group, a beta-di-(lower-alkyl)-amino lower-alkoxy ethyl group or a cyano group in the four position of the pyrrolidinone moiety are prepared from the corresponding 4-haloethyl compounds by methods known in the art using an alkali metal alcoholate, an alkali metal, e.g., sodium, solution of the selected alcohol and a metal cyanide. The preparations are illustrated by Examples 3–5.

EXAMPLE 3

1'-ethyl-4'-(β-methoxyethyl)-2'-oxo-spiro-[fluorene-9,3'-pyrrolidine]

A solution of 32.5 g. (0.10 mole) of 4'-(β-chloroethyl) - 1' - ethyl - 2' - oxo - spiro[fluorene - 9,3' - pyrrolidine] in 150 ml. of methanol was combined in a steel pressure vessel with 50 ml. of a 6% sodium methoxide solution. The sealed vessel was heated 18 hours at 140° C., cooled, the methanol solution removed and diluted with water giving 22 g. (68.5%) of brown solid which melted at 143–145° C. Recrystallization of the solid from methanol-water using charcoal gave 13.6 g. (42.4%) of colorless crystals which melted at 146.5–148° C.

*Analysis.*—Calculated for $C_{21}H_{23}NO_2$ (percent): N, 4.35. Found (percent): N, 4.60.

EXAMPLE 4

4'-(2-dimethylaminoethoxyethyl)-1'-ethyl-2'-oxo-spiro[fluorene-9,3'-pyrrolidine]

Sodium metal (3.2 g.; 0.139 mole) was reacted with 55 g. (0.615 mole) of 2-dimethylaminoethanol. Forty grams (0.123 mole of 4'-(2-chloroethyl)-1'-ethyl-2'-oxo-spiro [fluorene-9,3'-pyrrolidine] was added to the solution and the reaction mixture was brought to reflux. An additional 30 g. (0.336 mole) of 2-dimethylaminoethanol was added and the mixture refluxed for fifteen hours. The cooled reaction was added to ice and dilute hydrochloric acid and the dilute acid solution extracted three times with ether; from the combined ether extracts 4.8 g. (12%) of the original spiro compound was isolated. The aqueous acid solution was basified, the base insoluble oil extracted with ether, the ether extracts dried over sodium sulfate and concentrated. Distillation of the residue gave 32.6 g. (70.1%) of 4'-(2-dimethylaminoethoxyethyl)-1'-ethyl-2'-oxo - spiro[fluorene - 9,3' - pyrrolidine]; B.P. 220° C./ 0.13 mm.

EXAMPLE 5

4'-(β-cyanoethyl)-1'-ethyl-2'-oxo-spiro[fluorene-9,3'-pyrrolidine]

A mixture of 48 g. (0.147 mole) of 4'-(β-chloroethyl)-1'-ethyl-2'-oxo-spiro[fluorene - 9,3' - pyrrolidine], 10 g. (0.20 mole) of sodium cyanide and 600 ml. of dimethyl formamide was stirred 2.5 hours at 110° C. The reaction mixture was filtered, the filltrate was poured onto ice and the tan solid which separated was recrystallized from isopropanol to give 36.8 g. (79.3%) of tan solid melting at 162.5–164° C. Two crystallizations from 2-butanone gave a pale yellow solid which melted at 164.5–165° C.

*Analysis.*—Calculated for $C_{21}H_{20}N_2O$ (percent): C, 79.72; H, 6.37; N, 8.85. Found (percent): C, 79.52; H, 6.18; N, 8.80.

EXAMPLE 6

4'-(β-diethylaminoethyl)-1'-ethyl-2'-oxo-spiro[fluorene-9,3'-pyrrolidine]

A solution of 30 g. (0.09 mole) of 4'-(β-chloroethyl)-1'-ethyl-2'-oxo-spiro[fluorene-9,3'-pyrrolidine] and 22 g. (0.30 mole) of diethylamine in 250 ml. of absolute ethanol was heated eight hours at 110° C. in a steel pressure vessel. The basic material isolated from the reaction mixture was distilled giving 21.2 g. (65.0%) of pale yellow viscous oil distilling at 228–230° C./0.1 ml. Trituration of the viscous oil with absolute ether gave 18.8 g. (57.8%) of solid which melted at 98–103° C. Recrystallization from methanol-water raised the melting point to 101–105° C.

*Analysis.*—Calculated for $C_{24}H_{30}N_2O$ (percent): N, 7.73. Found (percent): N, 7.82.

EXAMPLE 7

1'-ethyl-2'-oxo-4'-(β-piperidinoethyl)-spiro[fluorene-9,3'-pyrrolidine]hydrochloride A mixture of 50 g. (0.154 mole) of 4'-(β-chloroethyl)-1'-ethyl-2'-oxo-spiro[fluorene - 9,3' - pyrrolidine], 28 g. (0.334 mole) of piperidine and 500 ml. of isopropanol was stirred and refluxed five hours. The solvent was removed by stripping and the residue partitioned between ether and water. The ether layer was concentrated, the residue dissolved in absolute alcohol and the solution treated with ethereal hydrogen chloride. The ether was decanted from the semi-solid precipitate which became crystalline on stirring with acetone. The dried crystalline hydrochloride weighted 40 g. (63.5%) and melted at 147–153° C. The salt was recrystallized from methyl isobutyl ketone containing a small amount of methanol. The purified hydrochloride salt melted at 162–164° C. and weighed 20.5 g. (32.6%).

*Analysis.*—Calculated for $C_{25}H_{31}ClN_2O$ (percent): Cl, 8.63; N, 6.82. Found (percent): Cl, 8.51; N, 6.88.

EXAMPLE 8

1'-ethyl-4'-(β-morpholinoethyl)-2'-oxo-spiro[fluorene-9,3'-pyrrolidine]hydrochloride A mixture of 40 g. (0.123 mole) of 4'-(β-chloroethyl)-1'-ethyl-2'-oxo-spiro[fluorene - 9,3 - pyrrolidine], 22 g. (0.253 mole) of morpholine and 300 ml. of isopropanol was refluxed overnight. The mixture was concentrated, the residue partitioned between water and ether and the water layer discarded. The ether layer was washed with 10% caustic solution, concentrated and the residue dissolved in alcohol. The alcohol solution was acidified with concentrated hydrochloric acid and the solution concentrated giving a partially solid residue which on trituration with ether gave 38.5 g. (76.1%) of crude material melting at 205–211° C. Crystallization of the crude material from methanol-ethyl acetate gave 16.3 g. (32.2%) of pure hydrochloride salt melting at 219–221° C.

*Analysis.*—Calculated for $C_{24}H_{29}ClN_2O$ (percent): N, 6.78; Cl, 8.58. Found (percent): N, 6.75; Cl, 8.74.

EXAMPLE 9

1'-ethyl-4'-[β-(4-methylpiperazino)ethyl]-2'-oxo-spiro[fluorene-9,3'-pyrrolidine]dimaleate A solution of 20 g. (0.2 mole) of N-methylpiperazine and 25 g. (0.0768 mole) of 4'-(β-chloroethyl)-1'-ethyl-2'-oxo-spiro[fluorene-9,3'-pyrrolidine] in 200 ml. of dry toluene was stirred and refluxed for 24 hours. The solution was concentrated and the residue was partitioned between chloroform and 10% sodium hydroxide. The chloroform layer was concentrated and the residue was distilled at reduced pressure; yield, 21 g. (70%); B.P. 260–270° C./0.02 mm. The distillate was dissolved with two equivalents of maleic acid in 150 ml. of dry methanol; the crystalline dimaleate salt melted at 186.5–188.5° C. after several recrystallizations from methanol.

*Analysis.*—Calculated for $C_{33}H_{39}N_3O_9$ (percent): C, 63.75; H, 6.32; N, 6.76. Found (percent): C, 63.48; H, 6.38; N, 6.88.

EXAMPLE 10

1'-ethyl-2'-oxo-4'-[β-(4-phenylpiperazino)ethyl]-spiro[fluorene-9,3'-pyrrolidine]

A mixture of 16.3 g. (0.05 mole) of 4'-(β-chloroethyl)-1'-ethyl - 2' - oxo-spiro[fluorene-9,3'-pyrrolidine], 24.4 g. (0.15 mole) of N-phenylpiperazine and 200 ml. of dry toluene was stirred and refluxed 28 hours. The mixture was concentrated to one-half the original volume and N-phenylpiperazine hydrochloride removed by filtration. The filtrate was concentrated further, cooled and the solid which precipitated was collected, dried and recrystallized from 2-butanone to give 18.7 g. (76.7%) of product which melted at 181.5–182.5° C.

*Analysis.*—Calculated for $C_{30}H_{33}N_3O$ (percent): C, 79.78; H, 7.36; N, 9.30. Found (percent): C, 79.85; H, 7.16; N, 9.26.

EXAMPLE 11

4'-[2,(β,β'-dihydroxydiethylamino)ethyl]-1'-ethyl-2'-oxospiro[fluorene-9,3'-pyrrolidine]

A solution of 42.0 g. (0.40 mole) of 2,2'-iminodiethanol in 150 ml. of isopropnaol was added dropwise to a stirred slurry of 59.5 g. (0.183 mole) of 4'-(β-chloroethyl)-1'-ethyl-2'-oxo-spiro[fluorene-9,3'-pyrrolidine] and 300 ml. of isopropanol. The stirred mixture was refluxed nineteen hours; the isopropanol was removed by stripping, the residue dissolved in chloroform and the chloroform solution washed twice with water to remove excess 2,2'-iminodiethanol and 2,2'-iminodiethanol hydrochloride. After drying over sodium sulfate the chloroform solution was concentrated at reduced pressure to give 65.8 g. (91.5%) of product as a viscous residue. A sample of the viscous residue was reacted with thionyl chloride to give 4'[2-(β,β' - dichlorodiethylamino)ethyl]-1'-ethyl-2'-oxo - spiro-[fluorene-9,3'-pyrrolidine]hydrochloride which melted at 93.5–98° C.

EXAMPLE 12

1' - methyl - 4' - (β - morpholinoethyl) - 2'-oxo-spiro-[10,11 - dihydro - 5H - dibenzo[a,d]cycloheptene-5,3'-pyrrolidine]hydrochloride hydrate A solution of 8.5 g. (0.025 mole) of 4'-(β-chloroethyl)-1' - methyl-2'-oxo-spiro[10,11-dihydro-5H-dibenzo[a,d]-cycloheptene-5,3'-pyrrolidine] in 50 ml. of morpholine was refluxed 1.5 hours. The solution was concentrated at reduced pressure and the residue partitioned between chloroform and dilute hydrochloric acid. The chloroform was washed with dilute sodium hydroxide and concentrated. The hydrochloride salt was prepared and recrystallized from methyl ethyl ketone-ethanol; yield 7.7 g. (68%); M.P. 250–252° C. (softens 245° C.).

*Analysis.*—Calculated for $C_{25}H_{33}ClN_2O_2$ (percent): C, 67.47; H, 7.47; N, 6.30. Found (percent): C, 67.99; H, 7.44; N, 6.37.

EXAMPLE 13

4' - (β - dimethylaminoethyl) - 1' - methyl - 2'-oxo-spiro-[10,11 - dihydro - 5H-dibenzo[a,d]cycloheptene-5,3'-pyrrolidine]hydroiodide A solution of 2.25 g. (0.05 mole) of dimethylamine in 25 ml. of ethanol and 8 g. (0.0235 mole) of 4'-(β-chloroethyl) - 1' - methyl - 2'-oxo-spiro[10,11-dihydro-5H-dibenzo[a,d]-cycloheptene-5,3'-pyrrolidine] was heated in a steel bomb at 130° C. for 18 hours. The solution was concentrated and the residue partitioned between chloroform and dilute sodium hydroxide. The chloroform was concentrated. The residue was dissolved in dilute hydrochloric acid and an aqueous solution of 8 g. sodium iodide added. The resulting oil crystallized and the solid was recrystallized from water-ethanol; yield 7 g. (62%).

*Analysis.*—Calculated for $C_{23}H_{29}IN_2O$ (percent): C, 57.98; H, 6.14; N, 5.88. Found (percent): C, 57.07; H, 6.27; N, 5.82.

EXAMPLE 14

1′-methyl-4′-(β-morpholinoethyl)-spiro[10,11-dihydro-5H-dibenzo[a,d]cycloheptene-5,3′-pyrrolidine]

A suspension of 7.7 g. (0.0168 mole) of 1′-methyl-4′-(β - morpholinoethyl) - 2′-oxo-spiro[10,11-dihydro-5H-dibenzo[a,d]cycloheptene-5,5′-pyrrolidine] hydrochloride in water was made basic with sodium hydroxide and extracted with ether. The ether was dried with sodium sulfate and concentrated. The residue was dissolved in 20 ml. of tetrahydrofuran and added to a suspension of 2 g. (0.053 mole) of lithium aluminum hydride in 50 ml. of tetrahydrofuran. The mixture was refluxed one week and 10 ml. of water added cautiously. The mixture was filtered, the filtrate concentrated and the residue crystallized twice from ethanol; yield 1.3 g. (20%).

*Analysis.*—Calculated for $C_{25}H_{32}N_2O$ (percent): C, 79.74; H, 8.57. Found (percent): C, 79.48; H, 8.60.

EXAMPLE 15

4′-(β-dimethylaminoethyl)-1′-methyl-spiro[10,11-dihydro-5H-dibenzo[a,d]cycloheptene-5,3′-pyrrolidine]

4′ - (β-dimethylaminoethyl)-1′-methyl-spiro[10,11-dihydro - 5H - dibenzo[a,d]cycloheptene-5,3′-pyrrolidine], M.P. 78–79° C., was prepared in 16% yield by lithium aluminum hydride reduction of the 2′-oxo precursor using the procedure of Example 14.

*Analysis.*—Calculated for $C_{23}H_{30}N_2$ (percent): C, 82.58; H, 9.04; N, 8.38. Found (percent): C, 82.47; H, 9.05; N, 8.25.

EXAMPLE 16

1′-ethyl-4′-(β-morpholinoethyl)-spiro[fluorene-9,3′-pyrrolidine]

A solution of 26.2 g. (0.074 mole) of 1′-ethyl-4′-(β-morpholinoethyl - 2′-oxo-spiro[fluorene-9,3′-pyrrolidine] in 200 ml. of dry tetrahydrofuran was added dropwise to a stirred slurry of 3.5 g. (0.093 mole) of lithium aluminum hydride in 100 ml. of dry tetrahydrofuran; gentle refluxing accompanied the addition. The reaction mixture was refluxed four hours, cooled and treated with an excess amount of water. After stripping the solvent from the solution, the residue was distilled to give 22.5 g. (84%) of product; B.P. 179° C./0.08 mm.

*Analysis.*—Calculated for $C_{24}H_{30}N_2O$ (percent): C, 79.51; H, 8.34; N, 7.73. Found (percent): C, 79.54; H, 8.33; N, 7.38.

EXAMPLE 17

1′-ethyl-4′-(β-piperidinoethyl)-spiro[fluorene-9,3′-pyrrolidine]

Using the procedure of Example 16, 32.9 g. (0.088 mole) of 1′ - ethyl - 2′-oxo-4′-(β-piperidinoethyl)-spiro-[fluorene-9,3′-pyrrolidine] was reduced using 5.0 g. (0.13 mole) of lithium aluminum hydride. The yield of the reduced material was 24.8 g. (78.5%); B.P. 178° C./0.83 mm.

*Analysis.*—Calculated for $C_{25}H_{32}N_2$ (percent): C, 83.34; H, 8.95; N, 7.77. Found (percent): C, 83.00; H, 9.06; N, 7.74.

EXAMPLE 18

1′-ethyl-4′-(β-dimethylaminoethoxyethyl)-spiro-[fluorene-9,3′-pyrrolidine]

Using the procedure of Example 16, lithium aluminum hydride (5.0 g.; 0.13 mole) reduction of 32.6 g. (0.086 mole) of 1′ - ethyl-4′-(β-dimethylaminoethoxyethyl)-2′-oxo-spiro[fluorene-9,3′-pyrrolidine] gave 26.9 g. (86%) of 1′-ethyl-4′-(β-dimethylaminoethoxyethyl)-spiro[fluorene-9,3′-pyrrolidine]; B.P. 177–180° C./0.15 mm.

*Analysis.*—Calculated for $C_{24}H_{32}N_2O$ (percent): C, 79.07; H, 8.85; N, 7.68. Found (percent): C, 79.49; H, 8.99; N, 7.64.

FORMULATION AND ADMINISTRATION

The present invention further provides pharmaceutical compositions comprising, as active ingredient, at least one of the compounds according to the invention in association with a pharmaceutical carrier or excipient. The compounds may be presented in a form suitable for oral or parenteral administration. Thus, for example, compositions for oral administration can be solid or liquid and can take the form of capsules, tablets, coated tablets, suspensions, etc., such compositions comprising carriers or excipients conveniently used in the pharmaceutical art. Thus suitable tableting excipients include lactose, potato and maize starches, talc, gelatin, and stearic and silicic acids, magnesium stearate, and polyvinyl pyrrolidone.

For parenteral administration, the carrier or excipient may be a sterile, parenterally acceptable liquid, e.g., water, or a parenterally acceptable oil, e.g., arachis oil, contained in ampoules.

Advantageously, the compositions may be formulated as dosage units, each unit being adapted to supply a fixed dose of active ingredient. Tablets, coated tablets, capsules, and ampoules are examples of preferred dosage unit forms according to the invention. Each dosage unit adapted for oral administration can conveniently contain 25 to 500 mg., and preferably 100 to 250 mg. of the active ingredient; whereas, each dosage unit adapted for intramuscular administration can conveniently contain 10 to 150 mg., and preferably 50 to 150 mg. of the active ingredient.

Examples of compositions within the preferred ranges given are as follows:

SYRUP

| Ingredients: | | Amts./5 cc. |
|---|---|---|
| (1) Active ingredient | mg | 250.0000 |
| (2) Glycerin | ml | 1.2500 |
| (3) Sorbitol solution | ml | 2.5000 |
| (4) Sodium sacharrin | mg | 1.0000 |
| (5) Sodium sucaryl | mg | 10.0000 |
| (6) Methyl p-aminobenzoate | mg | 5.0000 |
| (7) Propyl p-aminobenzoate | mg | 0.2500 |
| (8) Curacao flavor | ml | 0.0025 |
| (9) Water q.s. | ml | 5.0000 |

PROCEDURE (1) Dissolve (6) and (7) in hot water.
(2) This solution, when cool, is mixed with No. (3) and the mixture is stirred until uniform.
(3) Dissolve (1), (2), (4), (5) and (8) in this solution and stir until uniform.

CAPSULES

| Ingredients: | Per cap., mg. |
|---|---|
| (1) Active ingredient | 125.000 |
| (2) Lactose | 146.000 |
| (3) Magnesium stearate | 4.000 |

PROCEDURE (1) Blend (1), (2) and (3).
(2) Mill this blend and blend again.
(3) This milled blend is then filled into No. (1) hard gelatin capsules.

TABLETS

| Ingredients: | Mg./tab., mg. |
|---|---|
| (1) Active ingredient | 125.0 |
| (2) Corn starch | 20.0 |
| (3) Kelacid | 20.0 |
| (4) Keltose | 20.0 |
| (5) Magnesium stearate | 1.3 |

PROCEDURE (1) Blend (1), (2), (3) and (4).
(2) Add sufficient water portionwise to the blend from step No. (1) with careful stirring after each addition. Such additions of water and stirring continue until the mass is of a consistency to permit its conversion to wet granules.
(3) The wet mass is converted to granules by passing it through the oscillating granulator, using 8-mesh screen.
(4) The wet granules are then dried in an oven at 140° F.
(5) The dried granules are then passed through an oscillating granulator, using a 10-mesh screen.
(6) Lubricate the dry granules with 0.5% magnesium stearate.
(7) The lubricated granules are compressed on a suitable tablet press.

INTRAMUSCULAR INJECTION

| Ingredients: | Per ml. |
|---|---|
| (1) Active ingredient _____mg__ | 50.0 |
| (2) Isotonic buffer solution 4.0 ____ml__ | q.s. to 2.0 |

PROCEDURE (1) Dissolve the active ingredient in the buffer solution.
(2) Aseptically filter the solution from step No. (1).
(3) The sterile solution is now aseptically filled into sterile ampoules.
(4) The ampoules are sealed under aseptic conditions.

Various modifications and equivalents will be apparent to one skilled in the art and may be made in the compounds, methods, compositions, and procedures of the present invention without departing from the spirit or scope thereof, and it is therefore to be understood that the invention is to be limited only by the scope of the appended claims.

What is claimed is:
1. A compound selected from the group consisting of (a) spiro condensed aromatic compounds of the formula:

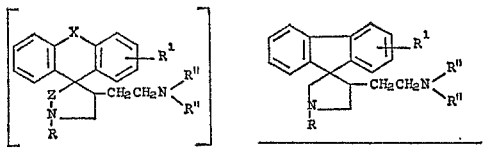

wherein;
R is selected from the group consisting of lower-alkyl, cyclohexyl and benzyl, R' is selected from the group consisting of hydrogen, chlorine, bromine, trifluoromethyl, lower-alkyl and lower-alkoxy,

is an amino radical selected from the group consisting of di-(lower-alkyl)-amino, di-(hydroxy-lower-alkyl)-amino, basic saturated monocyclic heterocyclic radicals selected from the group consisting of piperidino, morpholino, $N^4$-(lower-alkyl)piperazino, N - phenyl piperazino, and
(b) pharmaceutically acceptable acid addition salts thereof.

2. A compound of claim 1 which is 1'-ethyl-2'-oxo-4'-(β-piperidinoethyl) - spiro[fluorene - 9,3' - pyrrolidine]hydrochloride.

3. A compound of claim 1 which is 1'-ethyl-4'-(β-morpholinoethyl) - 2'-oxo-spiro[fluorene-9,3'-pyrrolidine]hydrochloride.

4. A compound of claim 1 which is 4'-(β-diethylaminoethyl)-1'-ethyl-2'-oxo-spiro[fluorene-9,3'-pyrrolidine].

5. A compound of claim 1 which is 1'-ethyl-4'-[β-(4-methylpiperazino)ethyl]-2'-oxo-spiro[fluorene - 9,3 - pyrrolidine]dimaleate.

6. A compound of claim 1 which is 1'-methyl-4'-(β-morpholinoethyl)-2'-oxo - spiro[10,11 - dihydro - 5H - dibenzo[a,d]-cycloheptene - 5,3' - pyrrolidine]hydrochloride hydrate.

7. A compound of claim 1 which is 4'-(β-dimethylaminoethyl)-1'-methyl-2'-oxo - spiro[10,11 - dihydro - 5H - dibenzo[a,d]-cycloheptene-5,3'-pyrrolidine]hydroiodide.

8. A compound of claim 1 which is 1'-ethyl-2'-oxo-4'-[β - (4 - phenylpiperazine)ethyl] - spiro[fluorene-9,3'-pyrrolidine].

9. A compound of claim 1 which is 4'-[2-(β,β'-dihydroxydiethylamino)ethyl] - 1' - ethyl - 2' - oxo-spiro[fluorene-9,3'-pyrrolidine].

References Cited
UNITED STATES PATENTS 3,153,050   10/1964   Davis _____ 260—326.5

ALEX MAZEL, Primary Examiner

J. A. NARCAVAGE, Assistant Examiner

U.S. Cl. X.R.

260—247.1, 247.5 B, 268 TR, 293.57, 293.58, 293.62, 326.3, 326.5 SA, 326.5 C, 326.5 D; 424—248, 250, 267, 274